United States Patent [19]

Burns et al.

[11] Patent Number: 5,277,927
[45] Date of Patent: Jan. 11, 1994

[54] METHOD OF APPLYING PRIMERS ONTO GLASS ELEMENTS OF VEHICLES

[75] Inventors: Andrew J. Burns, Westlake; James E. DeVries, North Olmsted; Gary A. Derian, Westlake; Robert D. Schneider, Vermilion, all of Ohio

[73] Assignee: Nordson Corporation, Westlake, Ohio

[21] Appl. No.: 855,973

[22] Filed: Mar. 23, 1992

[51] Int. Cl.$^5$ .............................................. B05D 5/00
[52] U.S. Cl. .................................... 427/8; 427/284; 427/287; 427/355
[58] Field of Search ............ 427/8, 10, 284, 355, 427/287; 118/109; 250/574, 561

[56] References Cited

U.S. PATENT DOCUMENTS

| | | | |
|---|---|---|---|
| 3,723,989 | 3/1973 | Fathauer et al. | 340/259 |
| 4,102,177 | 7/1978 | Okada et al. | 73/32 R |
| 4,141,390 | 2/1979 | Arnold et al. | 141/9 |
| 4,166,948 | 9/1979 | Steffen | 250/214 B |
| 4,260,258 | 4/1981 | Rose et al. | 356/335 |
| 4,367,244 | 1/1983 | Holmes et al. | 427/8 |
| 4,498,901 | 2/1985 | Finch | 604/65 |
| 4,503,806 | 3/1985 | Prusak et al. | 118/712 |
| 4,605,569 | 8/1986 | Shimada et al. | 427/284 |
| 4,673,820 | 6/1987 | Kamen | 250/573 |
| 4,680,462 | 7/1987 | Kamen | 250/222.1 |
| 4,680,977 | 7/1987 | Conero et al. | 73/861.41 |
| 4,720,636 | 1/1988 | Benner, Jr. | 250/573 |
| 4,736,704 | 4/1988 | Henninger | 118/688 |
| 4,820,281 | 4/1989 | Lawler, Jr. | 604/253 |
| 4,857,367 | 8/1989 | Thorn et al. | 427/348 |
| 4,935,261 | 6/1990 | Srivastava et al. | 427/10 |
| 5,002,539 | 3/1991 | Coble et al. | 604/253 |
| 5,012,496 | 4/1991 | Weinreb et al. | 377/21 |
| 5,045,069 | 3/1991 | Imparato | 604/253 |
| 5,049,368 | 9/1991 | Turner | 427/424 |
| 5,054,650 | 10/1991 | Price | 222/1 |

FOREIGN PATENT DOCUMENTS

0379908 8/1990 European Pat. Off. .

Primary Examiner—Michael Lusignan
Assistant Examiner—Katherine A. Bareford
Attorney, Agent, or Firm—Raymond J. Slattery, III

[57] ABSTRACT

A method of applying a clear glass primer material and then a black glass primer material onto the marginal edge of a windshield and/or rear window of a vehicle, in which a dispenser is employed to discharge such primer materials in discrete streams or drops. The streams or drops impinge upon the surface of the glass such that any ricocheting or deflection of the material will remain within the area to be coated or is entrapped by a felt wick or pad without splashing or overspray onto the surrounding surfaces. An optical detector is employed to monitor the streams or drops of primer material dispensed.

20 Claims, 3 Drawing Sheets

METHOD OF APPLYING PRIMERS ONTO GLASS ELEMENTS OF VEHICLES

FIELD OF THE INVENTION

This invention relates to preparing the window glass of automobiles or other vehicles for bonding with an associated body flange of the vehicle, and, more particularly, to a method of applying glass primer coatings onto the marginal edge of the windshield or other glass elements of the vehicle, in preparation of adhesively bonding the glass and body flange together.

BACKGROUND OF THE INVENTION

The assembly of the windshield, rear window and other glass elements of a vehicle to their associated body flanges is an important operation in the manufacture of vehicles, particularly from a safety standpoint. The federal government requires vehicles to pass a windshield retention test, and the materials which are used to assemble the windshield to the body flanges of the vehicle must be properly applied to pass the test and avoid expensive recalls.

The preparation of the windshield and associated body flange of a vehicle for assembly involves a number of operations. With respect to the windshield, glass manufactures supply automobile windshields with a "blackened area", i.e., an area of predetermined width along the marginal edge of the windshield which is covered with a black, ceramic frit having a roughened surface. It is the responsibility of the automotive manufacturer to prepare this blackened area for assembly to the body flange of the vehicle. First, a clear glass primer material is applied to the blackened area, usually with a wet brush manipulated by a robot or other automated brush mover. The primer may be applied to the bristles of the brush by dispensing the primer through the center of the brush. Preferably, a felt wick is dragged by the robot immediately behind the wet brush to wipe dry the clear glass primer, and to force the clear glass primer into the roughened surface of the blackened area. The clear glass primer prepares the blackened area for receipt of a coat of black glass primer material.

The next step in the preparation of the windshield for assembly to the vehicle body flang involves the application of a black glass primer over the area which had been previously coated with the clear glass primer. One method of applying the black glass primer to the windshield involves a manual operation using a flow brush or the like. This method is labor-intensive, and human applicators are prone to dripping some of the black glass primer from the brush onto areas outside of the blackened, ceramic frit. Such drips onto the clear portion of the glass are unacceptable and may require rejection of the windshield for use. Alternatively, the black material may be applied similarly to that used for the clear primer.

Figure 1:
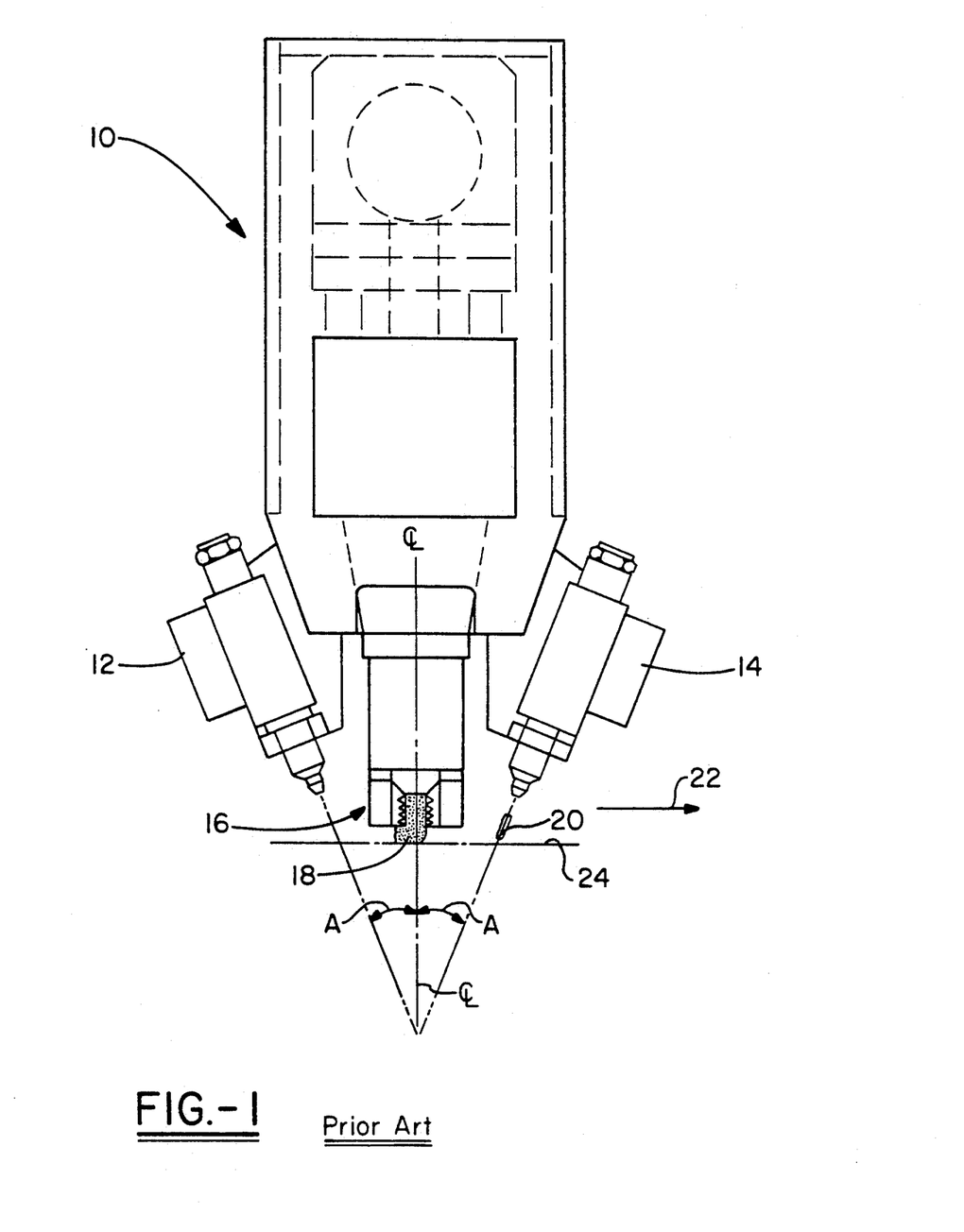
FIG. 1 is a schematic view of a prior art method of applying primer materials to the marginal edge of glass.

Another method shown schematically in FIG. 1, is to provide a continuous stream or intermittent streams, drops, of primer onto the windshield which are then distributed by a trailing pad of felt. A coating tool assembly 10 has been employed which carried two dispensing guns 12, 14 and a gripper assembly 16 which carries a pad or wick of felt 18. The dispensing guns 12, 14 have been oriented at an angle A which is substantially less than 45° from the vertical centerline CL of the gripper assembly 16. For example, assemblies have been used wherein the angle A has been in the range of 20°-25°. In this manner, the stream or drops 20 of fluid are dispensed substantially in front of the felt 18, the direction of movement of the assembly being indicated by arrow 22, were the trailing pad of felt is used to distribute and wipe the excess of the material from the glass 24. One problem with this method is that splashing of the primer outside of the blackened area onto the clear portions of the window may occur. Another problem is that with a continuous stream of fluid, it is difficult to control the exact amount of fluid applied to the glass.

Furthermore, the gripper assembly 16 tightly holds the felt 18 in contact with the glass 24. At times, the pressure of holding the felt in contact with the glass has actually shattered the glass. Also, it has been found that the amount of film build up of either the clear or black primer on the glass is related to the pressure exerted by the felt onto the glass. If too much pressure is applied, the felt, instead of uniformly spreading the primer over the area to be covered actually may wipe away the material. In such cases, the felt may act as a snow plow, pushing the material before it to the side. This may result in a heavier build up at the outer edges with a corresponding lesser amount in the central region.

One problem which has been experienced with the application of the primers onto the blackened area of the windshield is that it is difficult to maintain the proper amount of film build up, let alone the fact that it is difficult to determine how much clear glass primer has been applied (because it is not readily visible) and whether the desired amount of the surface area of the ceramic frit has been covered. An inadequate amount or film build of clear glass primer, and/or an incomplete covering of the surface area having the ceramic frit, can result in a failure of the windshield retention test after the windshield is installed.

Another means of applying the black glass primer onto the marginal edge of the windshield is disclosed, for example, in U.S. Pat. No. 4,857,367 to Thorn et al. This patent discloses an apparatus which comprises a liquid spray nozzle, an air nozzle and a vacuum device which are movable as a unit upon a robot arm relative to the marginal edge of a windshield. The liquid nozzle sprays atomized black glass primer material in a triangular pattern onto the edge of the windshield. In order to prevent oversprayed, atomized black glass primer from being deposited onto the clear portion of the windshield, the air nozzle directs a stream of air from the interior of the windshield outwardly so as to force any oversprayed primer particles away from the interior or clear portion of the windshield. The vacuum device is located beneath and alongside the peripheral edge of the windshield to draw a vacuum and collect the oversprayed primer particles which do not adhere to the glass.

While systems of the type disclosed in U.S. Pat. No. 4,857,367 are intended to avoid the drippage problem obtained with manual application of the black primer, it has been found that the application of at least some black glass primer onto the clear portion of the windshield can still occur. The vacuum device is not completely effective in collecting the oversprayed, atomized black glass primer discharged from the liquid nozzle, and some of this oversprayed black glass primer can fall onto the clear portion of the windshield.

The function of the black primer is to bond to the clear glass primer and to provide a good bonding site to beads of adhesive or sealants, such as illustrated in EPO 379 908 assigned to Essex Specialty Products, Inc. in the assembly of automobile windshields. The black primer also acts as a blocking agent for blocking the transmission of ultra violet light to the beads of adhesive or sealant. The ceramic frit does not completely block the transmission of ultra violet light. Therefore, improper application of the black primer may result in improper bonding of the adhesive/sealant and/or the degradation of the seal due to the ultra violet light.

As a result, it is very important to be sure that enough of the primers, either clear or black, are being deposited onto the glass. If for some reason the flow of material is reduced or stopped altogether, such as due to a partial or complete blockage of flow, improper bonding of the glass to the automobile may result.

SUMMARY OF THE INVENTION

It is therefore among the objectives of this invention to provide a method of applying the primer coatings to the marginal edge of the windshield or other glass sections of a vehicle, in which a consistent, uniform coating of primer material is produced and in which dripping, running and/or overspray of the primer material is avoided.

It is also the object of one embodiment of this invention to provide a method of monitoring the dispensing of the individual streams or drops of coating material dispensed. This may include determining if the material is being dispensed, or if it is being applied in the proper location, or if the proper amount of material is being dispensed.

These and other object, features, and advantages of the invention may be accomplished by: causing a felt wick and a dispensing means to be moved relative to the glass; intermittently dispensing a liquid primer material to impinge upon a predetermined portion of the glass such that deflected droplets or particles of the liquid primer material are substantially maintained within the predetermined portion of the glass or are entrapped by the felt wick, while substantially avoiding the application of liquid primer material onto the glass outside of the predetermined area; and distributing the dispensed liquid primer material over the predetermined area.

These and other objects, features, and advantages of the invention may also be accomplished by: causing a dispensing means to be moved with respect to the glass; intermittently dispensing a liquid primer material to form discrete streams or drops; producing a signal corresponding to the discrete streams or drops dispensed; distributing the dispensed liquid primer material over a predetermined area of the glass; and comparing the signal with a reference.

DESCRIPTION OF THE DRAWINGS

The following is a brief description of the drawings in which.

DETAILED DESCRIPTION OF THE INVENTION

Figure 2:
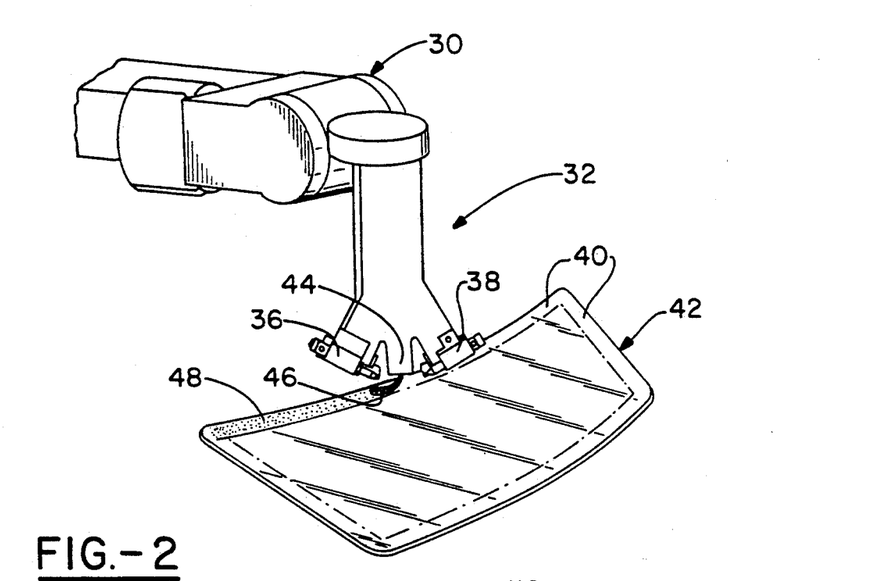
FIG. 2 is a schematic view of the application of one of the glass primer materials onto the marginal edge of a windshield of a vehicle.

With reference to FIG. 2, there is schematically illustrated a portion of an industrial robot arm 30, such as, for example, the type employed in the assembly of automobiles or other vehicles. Attached to the end of the robot arm 30 is a coating tool assembly, shown generally as reference numeral 32. The coating tool assembly includes a support member 34 for carrying two dispensing guns 36, 38 for dispensing the glass primer coatings onto the marginal edge 40 of the windshield 42 or other glass elements used in the assembly of vehicles. A gripper assembly 44, also attached to the support member 34, carries a pad or wick of felt or other materials, for example an open cell foam, such as 46 to uniformly dispense the coating material 48 (either the clear or black primer) uniformly about the marginal edge 40 of the windshield 42.

Figures 3, 5:
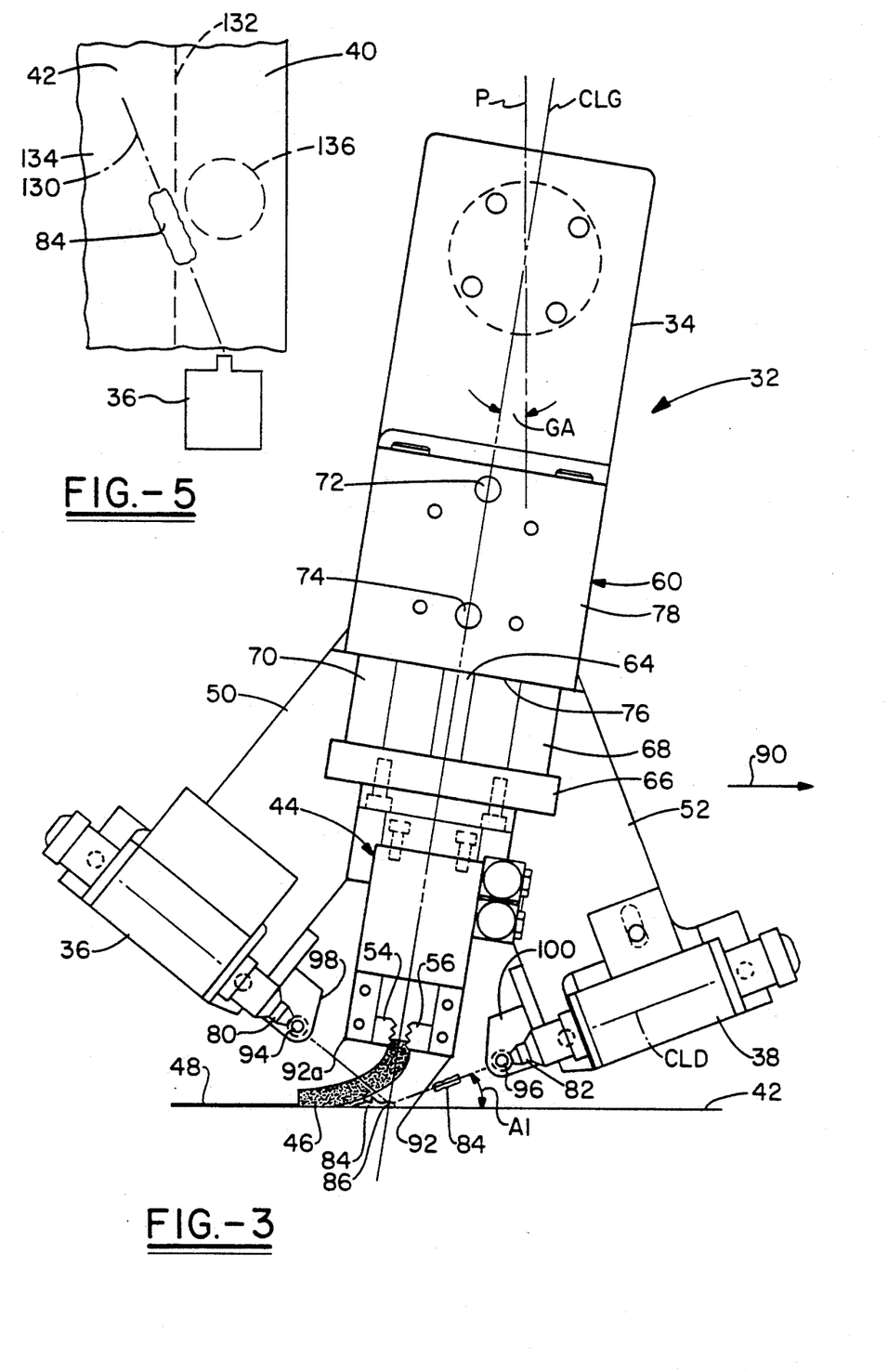
FIG. 3 is an enlarged elevational view of one embodiment of the invention according to the schematic of FIG. 2.
FIG. 5 is a plan view showing an alternate means of monitoring drops or streams.

Now with reference to FIG. 3, there is illustrated an enlarged elevational view of one embodiment of the invention, according to the schematic of FIG. 2. The central support member 34 may include two opposed arms 50, 52 for carrying the dispensing guns 36, 38 respectively. The dispensing guns may be a pneumatic actuated gun such as the fluid valve guns of the 0.2 and 0.5 mm type used for clear and black prime systems manufactured by Nordson Corporation, Amherst, Ohio, or, alternatively, the H200 Zero Cavity Gun, also manufactured by Nordson Corporation.

The gripper assembly 44 may be a pneumatic actuated device having a pair of jaws 54, 56 which open to receive a wick or pad of felt 46 and then close to retain it therein. The gripper assembly 44 may be coupled to a slide assembly 60 through an adapter block assembly 62.

The slide 60 includes an air actuated cylinder (not shown) which drives a piston 64 which is attached to a mounting bar 66. Coupled to the mounting bar 66 is the adapter block assembly and a pair of linear bearing slides 68, 70. The slide assembly 60 includes two air ports 72, 74 for causing the mounting bar to move from its fully extended position (as shown in FIG. 3) to a retracted position (not shown) juxtaposed to the lower edge 76 of the housing 78. This causes the gripper assembly 44 to be retracted from the fully extended position so that the nozzles 80, 82 of dispensing guns 36, 38 respectively may be cleaned as will be discussed further below.

The slide assembly 60 and the gripper assembly 44 are each available commercially and may be obtained, for example, from Phd Incorporated.

Each dispensing gun 36, 38 is mounted such that in operation, discrete streams or drops of liquid primer material will impinge upon the marginal edge to be coated, but will not splash or spray onto the glass outside of this area. Preferably, this may be accomplished by projecting the discrete streams or drops of fluid 84 such that they will impinge upon the glass in such a manner that if they become deflected or ricochet therefrom, the material will remain within the marginal area and/or become entrapped by the felt 46. In other words, a dispensed discrete stream or drop 84 which strikes the glass and is deflected therefrom, should be deflected into the felt 46. In this manner, even if the discrete stream or drop would be broken into smaller droplets or particles due to striking of the glass surface, they should all be retained within the felt. It is therefore believed to be more preferred that the dispensed fluid impinged the glass in the vicinity of the crotch 86 formed between the felt 46 and the glass 42.

Preferably, the clear and black primers are each dispensed from the dispensers 36, 38 under pressure. This causes the discrete stream or drop to be propelled from the gun, similar to a slug. A discrete stream means that the material dispensed may be larger than that commonly thought of as a drop, but is not continuous over the course of the application as would be the case if the gun was continuously actuated during the operation. Rather, the gun is repeatedly cycled on/off during the course of coating the marginal edge of a windshield to produce a series of pulses of material. However, it is preferred that the material be discharged from the nozzle substantially free of atomized particles.

It is believed important that the angle of incident AI in which the stream of material impinges the glass surface be less than 45°. The angle of incident AI may be determined by the angle formed between the glass 42 and the line CLD in which the material is dispensed from the nozzle during application. While coating tool assemblies have been produced in which the angle of incident AI is 30°, it is believed that the preferred range is from about 35° to about 10°.

The felt 46 distributes the dispensed liquid which remains on the glass or that has been absorbed therein, uniformly over the marginal edge of the glass to produce a uniform coating 48. As illustrated in FIG. 3, the movement of the coating tool assembly 34 is in the direction indicated by arrow 90. Once the marginal edge of the windshield has been completely coated, the jaws 54, 56 of the gripper assembly 44 retract to replace the existing felt 46 with a new felt wick or pad. The coating tool assembly 34 will then apply the second coat of primer (the black). The coating tool assembly will be rotated (counter clockwise as shown in FIG. 3) such that the gun 36 will make the appropriate angle of incident with the glass, such as, for example, the same angle which the gun 38 did. The felt 46 will then be curved in the opposite direction as that shown in FIG. 3, while the direction of movement will be opposite to that as indicated by arrow 90. Once the second coating material has been completely applied, the felt wick 46 will be removed and the slide assembly 60 will retract causing the gripper assembly 44 to be retracted. This will allow the nozzles 80, 82 of the dispensing guns 36, 38 to be brushed in order to clean any dried primer therefrom.

It has been found that by directly dispensing the discrete streams or drops of fluid directly into the felt 46, that splashing or spraying outside of the marginal area may occur. However, bouncing the liquid into the felt appears to dissipate enough of the energy that splashing or spraying does not occur. Therefore, it is preferred not to dispense directly into the felt. Also, it is undesirable to cause the coating tool assembly to exert a high force onto the felt to entrap it between the glass as has been done in the past. Rather, the coating tool assembly should allow the felt wick to have sufficient compliance such that it acts similar to a spring. This can be further accomplished by assuring that felt 46, makes sufficient contact with the glass in order to disburse the coating material, while also having compliance to compensate for deviations in the stand-off distance of the gripper from the glass, such as those caused by robotic programming errors, variations in the glass, and the positioning and retention of the glass by the fixture (not shown) during the coating operation.

It is preferred that the centerline CLG, of the jaws of the gripper assembly 44, is not oriented perpendicularly to the surface of the glass. Rather, it is preferred that the gripper assembly is skewed slightly with respect to the glass. This is desirable in order to assure that the wick 46, when initially dragged across the edge of the windshield, assumes the appropriate curved position and does not become distorted. The distance from the glass to the closest portion of the gripper assembly, i.e., the leading edge 92, is the stand off distance.

Also, it has been found that by angling the gripper from the traditional 90° there will be a corresponding change in the pressure applied by the felt to the glass. This result is achieved due to the changing contact area of the felt with the glass while maintaining the same force applied to the glass and the same felt length. Increasing the angle of the gripper GA, the angle formed between the centerline of the gripper CLG and a line P which is perpendicular to the glass, increases the contact area between the felt and the glass which in turn produces a greater film build. Therefore, the amount of film build may be varied by varying the angle of the gripper. While good results have been obtained with an angle GA of about 9°, it is believed that good results may also be obtained from 1° to 15°, although it is believed that this angle may vary up to about 40°.

It also should be noted that the density of the felt also affects the density of the film build. Typically, the lower the density of the felt, the more softer and more absorbent the felt will be. The more absorbent the felt is, generally will result in higher film builds than less absorbent felt of the same length.

The felt length is also important to the film build of the primer on the glass. Short felt length may result in little contact area, which may produce contact pressures which will result in the snow plowing of the material as described above. On the other hand, felt lengths which are too long may produce an uneven film build. This results due to such an increased contact area that the pressure is greatly reduced or becomes uneven over the total contact length of the felt. Therefore, the length of felt must be long enough that it is compliant, but not too long that the film build becomes uneven.

In the coating of automobile windshields, in which the material supplier has a film build specifically of 3 to 5 mm, good results have been achieved utilizing the glass primer coating material described in the example in detail below in which:

The angle of the gripper was 9°;
The stand off distance was ⅝";
The angle of incidence was 30°; and
The length of the felt is from about 1.75" to about 2" (not including the felt retained within the jaws of the gripper).

It should be understood that the length of the felt may vary due to change in the stand off distance. For the above, it can be seen that the length of the felt is about three times the stand off distance.

With reference also to FIG. 2, as the coating tool assembly 32 traverses along the marginal edge 40 of the windshield 42, it may be desirable to vary the number of drops or discrete streams of material dispensed. For example, as the coating tool assembly begins to provide a coat of primer onto the marginal edge of the glass, it may be desirable to provide for more droplets in order to saturate at least a portion of the felt 46. Once the felt 46 has been saturated, the interval between dispensing of streams or drops may then be reduced to a different rate. As the coating assembly continues to traverse its path, it may be necessary to change the rate of dispensing (i.e. varying the number of drops or streams dispensed over a given length of time or distance), the amount of material dispensed (such as varying the "on" time of the gun to vary the volume of material in a given drop or stream), or a combination of both. Therefore, the drops or streams may not be necessarily dispensed uniformly over the entire length of the marginal edge 40. Rather, the peripheral edge may be divided into at least two or more different zones. Such as for example a saturation zone in order to saturate the felt, and another zone comprising the rest of the peripheral area in which the drops or streams are dispensed at a rate to keep the felt saturated uniformly and to provide a uniform coverage over the marginal area. More zones may be provided, such as for example, to compensate for going around the corner.

As mentioned above, it is very important to provide a good uniform coverage of each primer material in order to assure the structural integrity of the windshield when applied to the automobile. Therefore, it is important to be sure that individual streams or droplets of material are actually being dispensed onto the glass. In order to verify the actual dispensing of material, each gun 36, 38 may be provided with a sensor 94, 96 for monitoring the dispensing of the fluid. In particular, the sensors 94, 96 may be a photoelectric sensor attached to the arms 50, 52 by a mounting bracket 98, 100 respectively. The sensors 94, 96 may be for example a convergence type sensor, such as a random bundle of bifurcated fiber-optic cables which sends and receives light. Alternately, the photo detector could be a through beam sensor requiring a transmitter and a separate receiver. However, good results have been obtained utilizing a photo detection system having an infrared light source which is manufactured by Banner Engineering Corporation, such as Model Numbers OSBFX (sensor head); OPBT2 (power pack), and BAT21.33SMSTI (cable). The sensors 94, 96 may be supplied with an air knife (not shown) wherein air is directed across the sensor in order to keep the sensor from being contaminated by priming material during dispensing.

Figure 4:
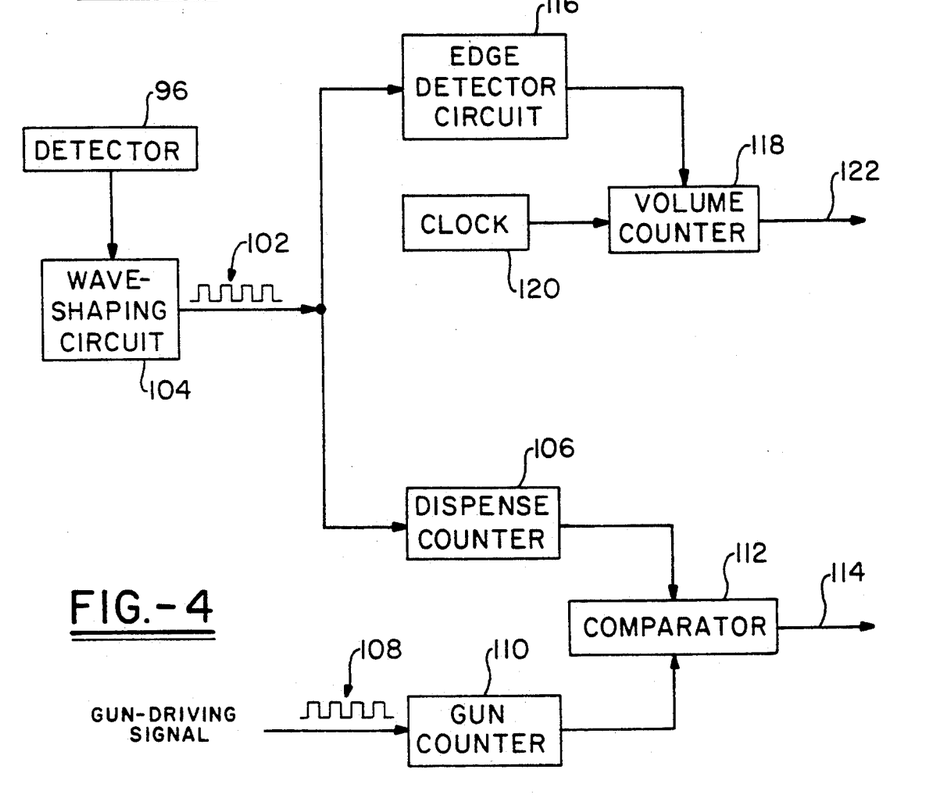
FIG. 4 is a schematic block diagram for the monitoring of drops or streams.

Now, with reference to FIGS. 3 and 4, as the discrete stream or drop 84 is propelled from the dispenser 38, it will intersect with the beam of light emitted from the convergence sensor. This will result in the light being reflected back to the sensor. However, while the stream or drop 84 is not present within the field of view of the sensor, the light will not be reflected back to the sensor. Therefore, the passing of a series of streams or drops will provide a series of pulses of reflected light. Passing the light received from the detector 96 to a wave shaping circuit will result in a square wave 102. The peaks and valleys of the square wave correspond to the transmission and the blockage of light respectively, which in turn correspond to the presence or absence of a stream or drop 84. The peaks or pulses of the square wave 102 should then correspond to the number of drops dispensed over a given interval. Coupling the output of the wave shaping circuit 104 to a counter 106 results in the count of the number of pulses dispensed over an interval. The gun 38, is actuated by a gun driving signal 108 which is also a series of pulses, which forms a square wave. The peaks correspond to the "on" duration of the gun, while the valleys correspond to the "off" duration of the gun. Coupling the gun driving signal 108 to a gun counter 110 produces a count indicative of the number of times the gun was required to actuate (dispense) over a given interval. Therefore, under normal operation, the number of times a gun was fired during an interval should result in a corresponding number of streams or drops dispensed therefrom. Therefore, the count obtained in counters 106, 110 should be equal at the end of an interval. If the drop counter 106 has less counts than that of the gun counter, this would indicate that material is not being dispensed from the nozzle 82 of the gun 38, such as due to clogging or some other interruption of flow of material, or that a stream or drop has been dispensed from the nozzle, but has failed to be detected within the field of view. In the later case, a partial clog could result in the discrete stream or drop of material being dispensed along a path which is skewed from its intended or preferred angle of incidence. This may result in the material being dispensed onto the windshield in an area where the primer material is not required. This will be discussed in further detail below. Therefore, coupling the outputs of the drop counter 106, and the gun counter 110 to the input of a comparitor 112 will produce a signal 114 if the counts are not equal, which indicates that an error has occurred.

Alternatively, the time interval between the peaks of the signal 102 could be compared to the time interval between the peaks of the gun driving signal 108. If the start of a pulse indicating the occurrence of a stream or drop exceeds a predetermined time limit after the gun driving should have activated the dispensing gun, then this would indicate that a discrete stream or drop had been missed.

The volume of fluid dispensed over an interval may also be determined. This may be accomplished by coupling the output of the wave shaping circuit 104 to a edge detection circuit 116. The edge detecting circuit 116 senses the rising and falling edges of the square wave 102. Upon sensing the rising edge of a square wave 102, corresponding to the beginning of the discrete stream or drop passing through the field of view of the detector 96, a signal is transmitted from the output of the edge detecting circuitry 116 to a counter 118. The counter 118 is coupled to a clock 120. Upon receiving the signal from the edge detecting circuitry 116, the counter 118 is enabled, which causes the counter to begin to count pulses received from the clock 120. Upon sensing a falling edge of the square wave 102, the edge detecting circuitry 116 will disable the output of the edge detecting circuitry, stopping the counter 118 from counting. The counter 118 then possess a total of counts that correspond to the time interval in which the stream or drop was present within the field of view of the detector. This then may be repeated for subsequent streams or drops dispensed over an interval. The volume counter 118 would therefore contain summation of each signal generated from the edge detecting circuitry 116 corresponding to the presence of the discrete stream or drop within the beam over the interval. The output of counter 118 may be then coupled via line 122 to a microprocessor based device (not shown), such as a computer, mini computer, etc., wherein the count total may be compared to a reference count. For example, if the reference count is equal to 1,000 counts, it may be determined that counts received from the volume counter 118 that are within a certain percentage, such as for example, plus or minus 5%, are within an acceptable range. Counts outside of this range, however, would indicate that either too much or too little fluid is being applied to the glass over this particular interval. At the end of each interval or measuring period, a reset signal (not shown) would reset each of the counters 106, 110, and 118 so that the above could be repeated for another interval.

The operation associated with the other dispensing gun 36, would be similar to that as described above for the application of the primer from dispensing gun 38.

Alternatively to mounting the sensors to look at dispensed drops 84 from the side as viewed in FIG. 3, it may be desirable to mount the sensors above (as viewed in FIG. 3) the dispensers. With reference to FIG. 5, a dispensed stream 84 may be skewed due to clogging of the nozzle as mentioned above such that its path or projection 130 will take it outside of the boundary 132 wherein the marginal edge 40 of the glass 42 is to be coated. In such a case, the stream 84 will strike the glass 42 in an area 134 wherein it is undesirable to have the primer material. Orienting a sensor above the nozzle, perpendicular to the intended centerline of dispensing of the gun should result in a field of view 136 which will allow for the detection of streams or drops which are directed within the intended area of coverage, i.e. the marginal area, but will not detect those drops or streams 84 which pass outside of the intended coverage area 40. In such an occurrence, the counted number of streams will be less than the number of gun pulses. This will allow for an alarm or other indication to be given. The convergence photo detector, as described in FIG. 3, similarly would be able to monitor streams or drops propelled outside of the marginal area. If a stream or drop does not pass through the focal point, the sensor will not detect it and the counter will be at least one less than the gun counter.

One example of glass primer coating material which have been used with the above invention is given below.

EXAMPLE

A. Clear Glass Primer For Windshield:
  Material: "BETASEAL" glass primer 435.18, Essex Specialty Products, Inc., Troy, Michigan
  Viscosity: 2 CPS
  Pressure: 14 to 103 kPa (2-15 psi).
B. Black Glass Primer for Windshield:
  Material: "BETASEAL" glass primer 435.20, Essex Specialty Products, Inc., Troy, Michigan
  Viscosity: 30 CPS
  Pressure: 28 to 138 kPa (4-20 psi).

While certain representative embodiments and details have been shown for the purposes of illustrating the invention, it will be apparent to those skilled in the art that various change and modifications may be made therein without departing from the scope of the invention.

For example, the detection system has been illustrated as providing detection of discrete streams or drops, however, it could well be utilized in detecting the presents or absence of a continuous stream. In such a case, the sensor would be providing an indication that material is being dispensed.

It is claimed:

1. The method of dispensing discrete streams or drops of fluid coating material onto a glass substrate comprising the steps of:
   a) causing a wick means and a dispensing means to be moved relative to the glass;
   b) intermittently dispensing the fluid material from said dispenser means such that said streams or drops are propelled under pressure to impinge upon the substrate at an angle of incident which is less than 45° while substantially avoiding the application of liquid coating material outside a portion of the substrate to be coated; and
   c) distributing the dispensed fluid material over the portion of the substrate to be coated by said wick means.

2. The method of claim 1 wherein at least some deflected droplets or particles of fluid coating material are entrapped by the wick means.

3. The method of claim 2 wherein the fluid material is directed to impinge within the vicinity of an area formed between the wick means and the glass.

4. The method of claim 1 wherein the discrete streams or drops of the fluid coating material impinge the portion of the glass to be coated in an area underneath a gripper assembly carrying the wick means.

5. The method of claim 1 wherein the intermittent dispensing of the fluid coating material is varied over the portion of the substrates to be coated.

6. The method of claim 4 wherein a means for retaining the wick means is skewed with respect to the substrate, such that a gripper angle, the angle formed between a center line of the gripper and a line perpendicular to the substrate, is from about 1° to about 15°.

7. The method of claim 1 wherein force is applied to the wick means, such that the wick means makes sufficient contact with the substrate to uniformly distribute the fluid material, while also maintaining sufficient compliance to compensate for deviations in distance to the substrate.

8. The method of claim 1 wherein the angle of incident is in the range of about 35° to about 10°.

9. The method of claim 1 comprising the step of: sensing the presence or absence of the discrete stream or drops dispensed from the dispenser, before the discrete stream or drops contact the substrate, and producing a single corresponding to the sensing; and
   comparing the signal with a reference.

10. The method of claim 9 wherein the signal corresponds to a total number of discrete streams or drops dispensed over an interval.

11. The method of claim 9 wherein the step of producing a signal includes:
   transmitting a beam of light;
   causing the discrete streams or drops to intersect with the beam of light; and
   generating a signal in response to the presence or absence of a stream or drop within the beam of light.

12. The method of claim 9 wherein the step of producing a signal includes:
   determining a volume of fluid dispensed to said substrate over an interval of time and generating a corresponding measurement signal.

13. The method of claim 10 further including:
   transmitting a beam of light;
   causing the discrete stream or drop to intersect the beam of light;
   generating a signal corresponding to the presence of a discrete stream or drop within the beam; and
   generating said measurement signal corresponding to a summations of each signal corresponding to the presence of a discrete stream or drop within the beam over an interval.

14. The method of preparing glass for attachment to a vehicle comprising the steps of:
 a) causing a dispensing means to be moved with respect to the glass;
 b) dispensing a liquid primer material to form a stream;
 c) producing a signal corresponding to the presence or absence of the dispensed stream at a point between the dispensing means and the glass; and
 d) uniformly distributing the dispensed liquid primer material over an area of the glass.

15. The method of preparing glass for attachment to a vehicle comprising the steps of:
 a) causing a dispensing means to be moved with respect to the glass;
 b) intermittently dispensing a liquid coating material to form discrete streams or drops;
 c) sensing the presence or absence of the discrete streams or drops dispensed from the dispenser, before the discrete streams or drops contact the glass, and producing a signal corresponding to the sensing;
 d) distributing the dispensed liquid coating material over an area of the glass; and
 e) comparing the signal with a reference.

16. The method of claim 15 wherein the signal of stem (c) corresponds to a total number of discrete streams or drops dispensed over an interval.

17. The method of claim 15 wherein step (c) includes:
 transmitting a beam of light;
 causing the discrete streams or drops to intersect with the beam of light; and
 generating a signal in response to the presence or absence of a stream or drop within the beam of light.

18. The method of claim 17 wherein step (c) further includes:
 generating said signal corresponding to an interval between the presence of a stream or drop in the beam of light and a subsequent presence of another stream or drop in the beam of light.

19. The method of claim 5 wherein step (c) includes:
 determining a volume of fluid dispensed to said glass over an interval of time and generating a corresponding measurement signal.

20. The method of claim 19 wherein step (c) further includes:
 generating a signal corresponding to the presence of a discrete stream or drop within a beam of light; and
 generating said measurement signal corresponding to a summations of each signal corresponding to the presence of a discrete stream or drop within the beam over an interval.

* * * * *

UNITED STATES PATENT AND TRADEMARK OFFICE
CERTIFICATE OF CORRECTION

PATENT NO. : 5,277,927
DATED : January 11, 1994
INVENTOR(S) : Andrew J. Burns, et al.

It is certified that error appears in the above-indentified patent and that said Letters Patent is hereby corrected as shown below:

Column 1, line 45, "flang" should be --flange--.

Column 8, line 36, "a" should be --an--.

Column 9, line 54, "change" should be --changes--.

Column 10, line 41, "single" should be --signal--.

Column 12, line 1, "stem" should be --step--.

Signed and Sealed this

Fourteenth Day of May, 1996

Attest:

BRUCE LEHMAN

Attesting Officer   Commissioner of Patents and Trademarks